UNITED STATES PATENT OFFICE.

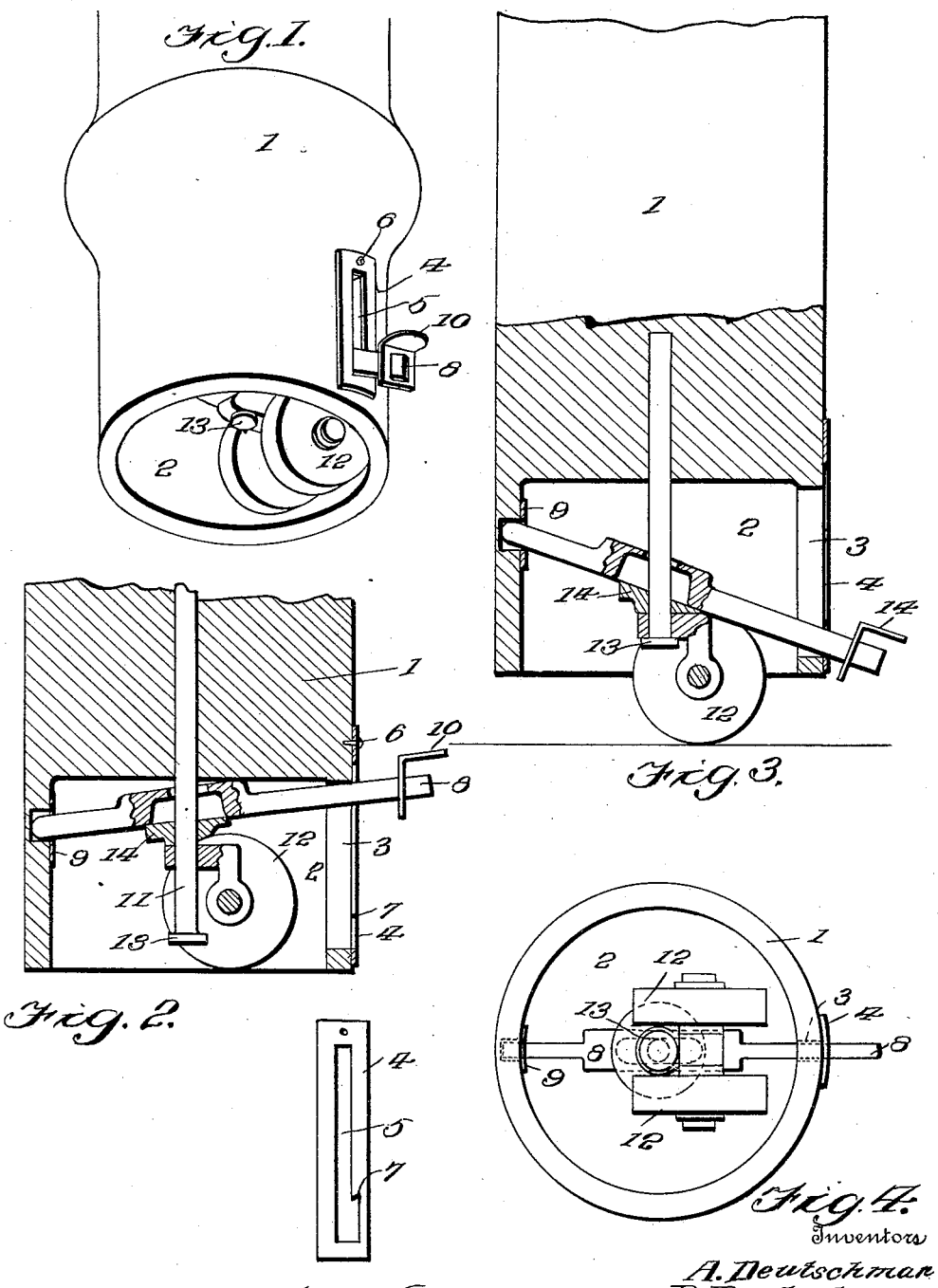

ALEXANDER DEUTSCHMAN AND ROBERT DEUTSCHMAN, OF BOUNTY, SASKATCHEWAN, CANADA.

CASTER.

1,050,352.  Specification of Letters Patent.  Patented Jan. 14, 1913.

Application filed January 9, 1912. Serial No. 670,298.

*To all whom it may concern:*

Be it known that we, ALEXANDER DEUTSCHMAN and ROBERT DEUTSCHMAN, citizens of the United States, residing at Bounty, in the Province of Saskatchewan, Canada, have invented certain new and useful Improvements in Casters, of which the following is a specification.

This invention comprehends certain new and useful improvements in furniture casters, and has for its main object to provide an arrangement for raising and lowering the caster, thus allowing the article of furniture to which it is attached to rest squarely on the floor, except at times that it is desired to move said article of furniture, when the said caster is lowered to its operative position.

With this and other objects in view as will more fully appear as the description proceeds the invention consists in certain constructions, arrangements and combinations of the parts that we shall fully describe and claim.

For a full understanding of the invention reference is to be had to the following description and accompanying drawing, in which:

Figure 1 shows a perspective view of our caster mounted within a furniture leg; Fig. 2 is a sectional view of the same in its inoperative position; Fig. 3 is a sectional view of the same in its operative position; Fig. 4 is a plan view of the caster within the furniture leg; and Fig. 5 is a detail view showing the lever engaging plate.

Corresponding and like parts are referred to in the following description and indicated in all the views of the accompanying drawing by the same reference characters.

Referring to the drawing, the numeral 1 designates the leg of a piece of furniture, the bottom of which is provided with a recess 2 designed to accommodate our improved device. A vertically disposed slot 3 is formed in the leg 1 and communicates with the recess 2. A plate 4, formed with an aperture 5 corresponding to the said slot, is mounted to swing on a pin 6 secured to the leg, said aperture 5 being widened at its lower end to form a square shoulder 7. A lever 8, passing through the slot 3 in the aperture 5, is pivotally mounted in the wall of the recess diametrically opposite to the slot 3 in a bearing 9, said lever being provided at its external end with a thumb plate 10 for raising and lowering the same. Centrally disposed in the recess 2 is a vertical pin 11 which passes through an opening formed in the lever 8, and a caster 12, of the usual construction, is rotatably mounted on said pin and is free to be raised or lowered thereon within the limits of the retaining head 13 and the lever 8. A washer 14, relatively thick on one side, is mounted on the pin 11 between the caster 12 and the lever 8, thus insuring a firm bearing for said caster when the lever is engaged.

From the foregoing description in connection with the accompanying drawing, the operation of our improved caster will be apparent. Assuming that the leg is in direct contact with the floor, and it is desired to move the supported piece of furniture, the lever 8 is pushed down by means of the thumb plate 10 and the plate 4 is swung about the pin 6 so as to cause the shoulder 7 to engage the lever 8, thus retaining it in its depressed position. As the lever 8 descends it engages the washer 14 which in turn engages the caster 12, pushing it down on the pin 11 until the said caster strikes the floor, when, in combination with the washer 14, it acts as a fulcrum for the lever 8, the work end of said lever being engaged with the furniture leg through the bearing 9 the piece of furniture is raised and the said caster supports the weight through the lever 8.

Having thus described the invention, what is claimed as new is:

1. The combination with an article of furniture embodying a leg formed at its lower end with a recess, of a furniture caster journaled within said recess, a vertically disposed pin journaling said caster and on which the caster is free to be raised or lowered, and an operating lever controlling the vertical movement of said caster.

2. The combination with an article of furniture embodying a leg formed at its lower end with a recess, of a furniture caster freely journaled within the recess and capable of vertical movement therein, a lever mounted partly within and partly outside of the furniture leg and controlling the vertical movement of said caster, and a plate having a slot provided with a lever engaging shoulder through which slot the lever operates.

3. The combination with an article of furniture embodying a leg formed at its lower end with a recess, of a pin secured within said recess, a caster mounted to rotate and move longitudinally on said pin, a lever pivotally mounted in the wall of the recess and extending thereacross, said lever being formed with an opening through which said pin passes, the leg being further formed with a slot communicating with said recess and through which the lever passes, means for retaining said lever in lowered position, and a washer mounted on said pin between the caster and the lever and adapted for engagement by said lever when the lever is moved downward.

4. The combination with an article of furniture embodying a leg formed at its lower end with a recess, of a pin vertically disposed in the recess and held against movement, a caster mounted for reciprocation on said pin, and means for reciprocating the caster.

5. The combination with an article of furniture embodying a leg formed at its lower end with a recess, of a vertically and centrally disposed pin rigidly fixed in said leg and extending into the recess, a caster reciprocally mounted on said pin, means for moving the caster downwardly on the pin, and means for locking the caster in lowered position.

In testimony whereof, we affix our signatures in presence of two witnesses.

ALEXANDER DEUTSCHMAN. [L. S.]
ROBERT DEUTSCHMAN. [L. S.]

Witnesses:
L. H. MATCHAM,
H. L. McPHERSON.

Copies of this patent may be obtained for five cents each, by addressing the "Commissioner of Patents, Washington, D. C."